May 22, 1945.　　　　C. A. HOGAN　　　　2,376,773
RAYON OR NYLON TIRE CORD INSPECTING REEL
Filed June 7, 1944　　　3 Sheets-Sheet 1

Inventor
C. A. Hogan
By Lester L. Sargent.
Attorney

May 22, 1945.  C. A. HOGAN  2,376,772
RAYON OR NYLON TIRE CORD INSPECTING REEL
Filed June 7, 1944    3 Sheets-Sheet 2

Inventor
C. A. Hogan
By Lester L. Sargent
Attorney

May 22, 1945.   C. A. HOGAN   2,376,773
RAYON OR NYLON TIRE CORD INSPECTING REEL
Filed June 7, 1944   3 Sheets-Sheet 3

Inventor
C. A. Hogan
By Lester L. Sargent
Attorney

Patented May 22, 1945

2,376,773

UNITED STATES PATENT OFFICE 2,376,773

RAYON OR NYLON TIRE CORD INSPECTING REEL

Claude Avons Hogan, Cedartown, Ga.

Application June 7, 1944, Serial No. 539,125

9 Claims. (Cl. 28—1)

The object of my invention is to provide a novel reel for inspecting tire cord made of rayon or nylon. Inspecting tables used for cotton tire cord cannot be used for rayon or nylon due to crawling or slipping of the fabric thus causing damage to the fabric when rolled up on cotton cord tables. With my new tire cord reel this slipping and consequent damage to the fabric is eliminated.

I attain these and other objectives of my invention by the mechanism illustrated in the accompanying drawings in which.

Like numerals designate like parts in each of the several views.

Figures 1, 2:
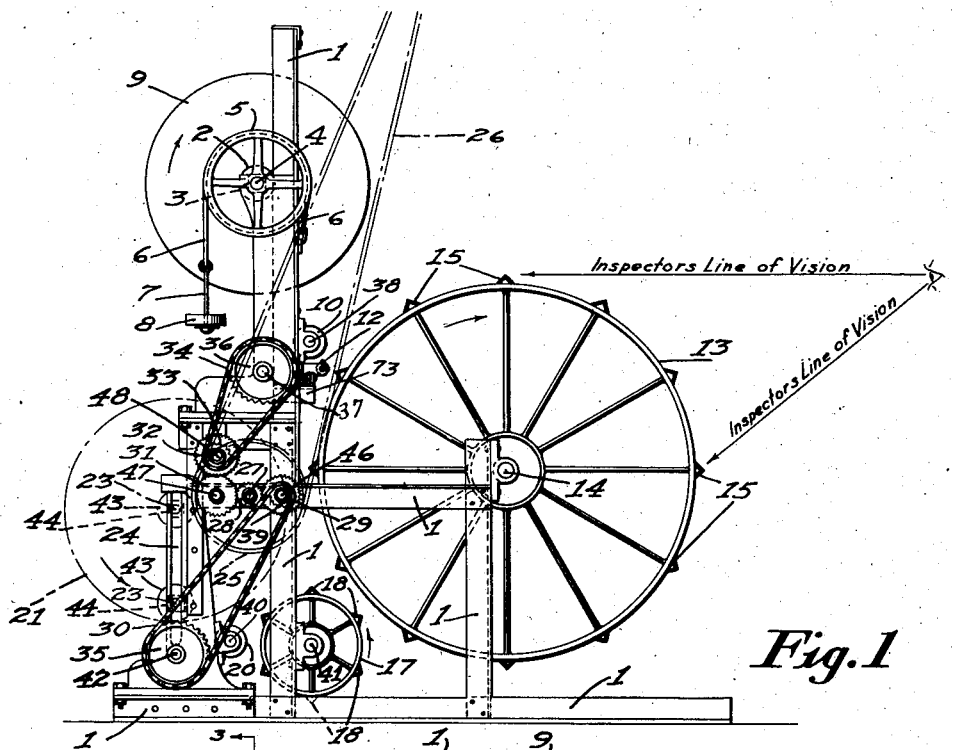
Figure 1 is a side elevation of my reel.
Fig. 2 is a rear plan view of same.

Referring to the accompanying drawings, my machine has a frame 1, an upper roller 2, mounted on a squared shaft 3, which has somewhat elliptically shaped ends 4. On one end 4, as shown in Fig. 2, is mounted a drum 5, over which extends a leather belt 6 to which is attached a hook 7 carrying a weight 8.

Figure 3:
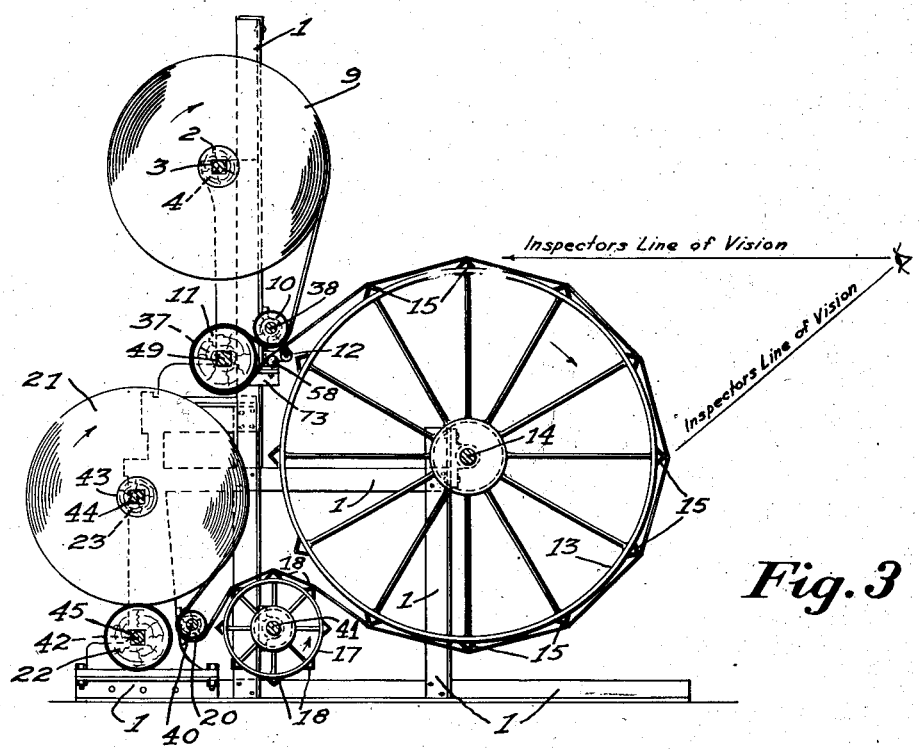
Fig. 3 is a side elevation of the invention viewed from the opposite side from that shown in Fig. 1.

The roller 2 carries a roll of rayon or nylon fabric 9. The strip of fabric from this roll 9 passes over a guide roller 10, as shown in Fig. 3. The guide roller 10 is mounted on a shaft 38, as shown in Figs. 2 and 1. After passing over the underside of guide roller 10, the fabric passes over the unwinding roller 11 and angular spreader bar 12 to the inspecting reel 13, as shown in Fig. 3. Inspecting reel 13 is mounted on axle 14 which is mounted on the framework 1 of the machine.

The inspecting reel 13 has a series of equally spaced angle bars 15. Each of the angle bars 15 is provided with precision spaced slots or thread guide recesses 16 for the rayon threads.

After the fabric passes from the inspecting reel, it travels to a transfer reel 17 near the bottom of the machine. The transfer reel 17 is mounted on shaft 41 carried by the framework 1, as shown in Fig. 3. Transfer reel 17 is provided with equally spaced bars 18 provided with precision slots 19 identically spaced with the slots 16 of the bars 15 of the inspecting reel 13.

The fabric after leaving the transfer reel 17, passes under the guide roller 20, which is mounted on shaft 40, as shown in Figs. 1 and 3, and thence passes to the winding roll 21 of fabric that has been inspected. Reel 17 is mounted on shaft 41 as shown in Figs. 1 and 3.

The winding roller 22, frictionally engages the winding roll 21 of fabric. Winding roller 22 is mounted on a shaft 45, as shown in Figs. 2 and 3. The inspected fabric 21 is wound on a roller 43, which is carried by a squared shaft 44. The squared shaft 44 has rounded ends 23 as shown in Fig. 2. The ends 23 of shaft 44 are vertically slidable in the like vertical guides 24 at each end of the roller 43. The guides 24 consist of spaced vertical bars and permit of vertical movement of the roller 43 as the fabric is wound on the roll 21, carried by roller 43, and the fabric roll tends to increase in size.

Referring to Figs. 1 and 2, I provide a pulley 25, driven by the belt 26. Pulley 25 is mounted on the shaft 27 which also carries the gear 28. Gear 28 meshes with driven gears 29 and 31. Gear 31 is mounted on a stub shaft 47, as shown in Fig. 1. As shown in Fig. 2, a sprocket chain 30 extends from driven gear 29 to gear 35 which is mounted on shaft 42 which also carries a winding roller 22 that frictionally engages the fabric roll 21 on which the inspected fabric is wound.

A third driven gear 32 meshes with the driven gear 31, as shown in Fig. 1. On the same shaft 48 which carries gear 32, is a sprocket gear 33 which drives the sprocket chain 34. Sprocket chain 34 drives the sprocket gear 36 which is mounted on shaft 37 on which is also mounted the roller 11, as shown in Fig. 3. The shaft 42 of winding roller 22 is extended at one end as shown in Fig. 2 and carries the gear 35, as shown in Fig. 1.

Sprocket gear 39, is mounted on the stub shaft 46, which also carries the gear 29, as shown in Fig. 1. The sprocket gear 39 is driven by sprocket chain 30.

Shaft 44, which carries roller 22 is provided with rounded ends 42 which are mounted in the framework 1, one of these rounded ends being extended to carry the sprocket wheel 35.

A stub shaft 46 carries the sprocket gear 33 as shown in Figs. 1 and 2. Unwinding roller 11 is mounted on a squared shaft 49. Said shaft 49 is provided with somewhat elliptically shaped ends.

In using the machine, the winding roll 22 directly under the roll of fabric 21 at the bottom of the machine, is so geared through the series of gears and chain drives, above described, and illustrated in Figs. 1 and 2, that the exact amount of tension is put on rayon fabric necessary to hold it straight on the inspecting reel 13, and also to make a hard roll of fabric when wound up on roll 21 at the finish of the inspection period. The selvage placing roll 58 pulls selvage out to full width before reaching the angle or spreader bars which spread the entire surface of the fabric out to the desired width.

Figures 4, 5:
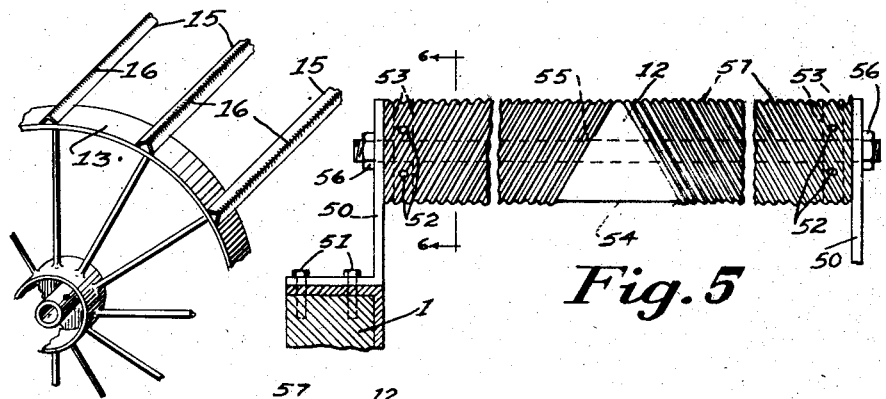
Fig. 4 is a detailed perspective view of a portion of the reel and its bars showing their toothed construction.
Fig. 5 is a front elevation of the unwinding roller, a portion of the frame of the machine on which it is mounted being shown in section and portions of the roller being broken away to save space on the drawing sheet.
Figure 6:
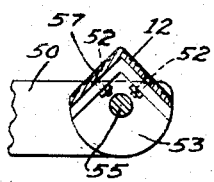
Fig. 6 is a section on line 6—6 of Fig. 5.

Referring to Fig. 5, I provide brackets 50 secured by bolts 51 to frame 1. Adjacent brackets 50, are plates or fittings 53, which act as a bearing for shaft 55. Two small bolts 52 near each bracket attach the angular spreader bar 12 to fitting 53. The spreader bar has a series of grooves or corrugations 57 extending from the upper edge portion of the spreader bar 12 in opposite diagonal directions. These grooves of corrugations 57 are disposed as shown in Fig. 5, to function to spread the threads for inspection. Shaft 55 is secured to the brackets 50 by the nuts 56.

Figure 7:
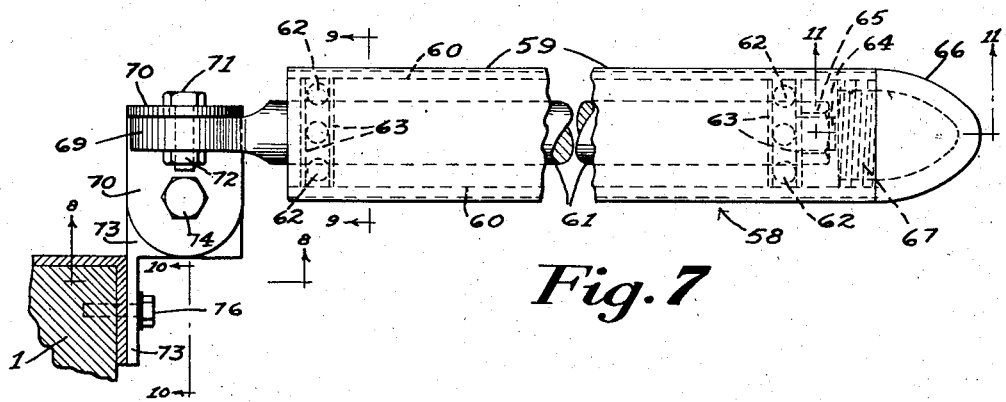
Fig. 7 is a top plan view of the selvage placing roller, a portion being broken away to save space, and a portion of the frame being shown in section.
Figure 8:
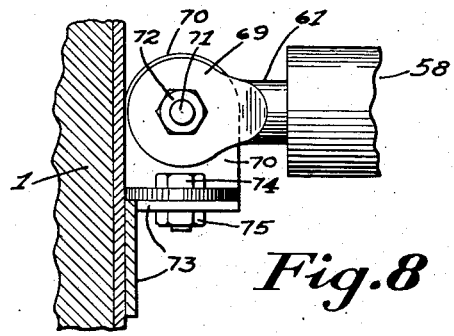
Fig. 8 is a detailed side elevation on section line 8—8 of Fig. 7.
Figure 9:
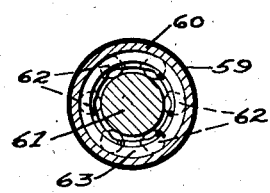
Fig. 9 is a section on line 9—9 of Fig. 7.

Referring to Figs. 3 and 8, a selvage, placing roller 58 is shown in its entirety. In Fig. 7, the same roller is illustrated. The rubber covering is designated 59, and the steel roller casing on which rubber covering 59 is mounted is designated 60. The steel roller casing 60 is mounted on roller bearings 62, which in turn are mounted on shaft 61, as shown in section in Fig. 9. Retaining flanges 63 are provided for the ball bearings. Shaft 61 has a threaded end 64, as shown in dotted lines in Fig. 7. A nut 65 is provided to hold the roller casing and ball-bearing flange on shaft 61. The flanges 63 are permanently attached on the roller casing. The selvage placing rollers 58 are oppositely disposed and positioned as shown in Fig. 3.

Figure 10:
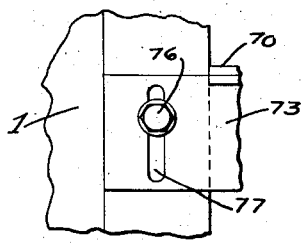
Fig. 10 is a detail of the bracket and adjusting means on which the selvage placing roller is mounted.
Figure 11:
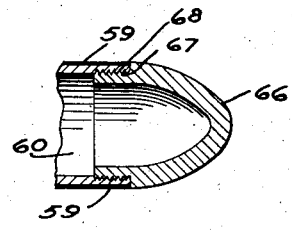
Fig. 11 is a detailed sectional view on line 11—11 of Fig. 7.

A large metal cap 66 closes the end of the steel roller casing and is secured to it by its threaded end 67 which meshes with the threaded end of the roller casing 60, as shown in Fig. 11. The shaft 61, as shown in Figs. 7 and 8, terminates in the flat circular end 69 and is fastened to the bracket 70 by the bolt 71 and nut 73. Bracket 70 is mounted on another bracket 73 to which it is fastened by the bolt 74 and nut 75, as shown in Fig. 8. A bolt 76, as shown in Fig. 7 fastens bracket 73 to frame 1. A slot 77 in bracket 73, through which bolt 76 extends, as shown in Fig. 10 permits of vertical adjustment of the bracket and the whole roller device.

While the claims are directed to the use of rayon, the device may be used with other synthetic or artificial yarns such as nylon.

What I claim is:

1. In a tire cord inspecting reel, the combination of a frame, carrying an upper roller, a drum mounted on the same shaft with the said roller, a strap passing about the drum, a weight depending from the said strap, a roll of rayon fabric on the upper roller, a guide roller over which the fabric passes, an unwinding roller, an inspecting reel having spaced bars, a transfer reel to which the fabric passes from the inspecting reel, a guide roller to which the fabric passes from the transfer reel, and a winding roller.

2. In a tire cord inspecting reel, the combination of a frame, carrying an upper roller, a drum mounted on the same shaft with the said roller, a strap passing about the drum, a weight depending from the said strap, a roll of rayon fabric on the upper roller, a guide roller over which the fabric passes, an unwinding roller, an inspecting reel having spaced bars, a transfer reel to which the fabric passes from the inspecting reel, a guide roller to which the fabric passes from the transfer reel, a winding roller, and a roll on which the inspected fabric is wound, the winding roller frictionally engaging the winding roll of fabric.

3. In combination with the mechanism defined in claim 1, the spaced bars of the inspecting reel being angle bars and having precision-spaced slots for the rayon threads.

4. In combination with the mechanism defined in claim 1, the spaced bars of the inspecting reel being angle bars and having precision-spaced slots for the rayon threads, the transfer reel having equally spaced angle bars, said bars also having precision slots for the rayon or nylon thread.

5. In a tire cord inspecting reel, the combination of a frame, an upper roller, a drum mounted on the same shaft with the said roller, a weight depending from said drum, a roll of rayon fabric on the upper roller, an unwinding roller, an inspecting reel having equally spaced slotted angle bars for the rayon threads, a transfer reel having equally spaced slotted angle bars for the rayon threads, and means for winding said threads after they leave the transfer reel.

6. In a tire cord inspecting reel, the combination of a frame, an upper roller, a drum mounted on the shame shaft with the said roller, a weight depending from said drum, a roll of rayon fabric on the upper roller, an unwinding roller, an inspecting reel having equally spaced slotted angle bars for the rayon threads, a transfer reel having equally spaced slotted angle bars for the rayon threads, and a winding roller, a roll on which the fabric is wound, said roller having a squared shaft, the ends of said shaft being somewhat elliptically shaped, and guide bars on opposite ends of the roller loosely engaging the rounded ends of the roller shaft and permitting free vertical movement of said roll of fabric as it increases in size.

7. In combination with the mechanism defined in claim 6, a series of gears and chain drives whereby the exact amount of tension is put on the rayon or nylon fabric to hold it straight on the inspecting reel.

8. In combination with the mechanism defined in claim 5, a spreader bar having grooves disposed diagonally to cause the material to expand as it passes over the spreader bar.

9. In a rayon cord inspecting reel, the combination of a frame, carrying an upper roller, a drum mounted on the same shaft with the said roller, a weight depending from the said drum, a roll of rayon fabric on the upper roller, a guide roller over which the fabric passes, an unwinding roller, an inspecting reel having spaced bars; oppositely disposed selvage placing rollers adjacent the unwinding roller; a spreader bar having reversely disposed diagonally slanting grooves for spreading the fabric before it passes to the inspecting reel; a transfer reel to which the fabric passes from the inspecting reel, a guide roller to which the fabric passes from the transfer reel, and a winding roller.

CLAUDE AVONS HOGAN.